(12) United States Patent
Hayashi et al.

(10) Patent No.: US 7,111,876 B2
(45) Date of Patent: Sep. 26, 2006

(54) FLANGE

(75) Inventors: Kaneyoshi Hayashi, Kawaguchi (JP); Shigeyoshi Hayashi, Kawaguchi (JP)

(73) Assignee: Sankei Giken Co. Ltd., Kawaguchi (JP)

( * ) Notice: Subject to any disclaimer, the term of this patent is extended or adjusted under 35 U.S.C. 154(b) by 0 days.

(21) Appl. No.: 10/762,761

(22) Filed: Jan. 22, 2004

(65) Prior Publication Data

US 2005/0052026 A1   Mar. 10, 2005

(30) Foreign Application Priority Data

Sep. 5, 2003   (JP) .............................. 2003-314601

(51) Int. Cl.
*F16L 23/00* (2006.01)
(52) U.S. Cl. ..................................... 285/415
(58) Field of Classification Search ................. 285/415
See application file for complete search history.

(56) References Cited

U.S. PATENT DOCUMENTS

| 432,318 | A | * | 7/1890 | Mathews | 285/368 |
|---|---|---|---|---|---|
| 961,987 | A | * | 6/1910 | Rust | 285/412 |
| 1,075,760 | A | * | 10/1913 | Butler | 411/540 |
| 1,784,667 | A | * | 12/1930 | Gillet | 411/532 |
| 1,893,841 | A | * | 1/1933 | Merritt | 285/135.5 |
| 2,449,795 | A | * | 9/1948 | Stillwagon | 285/104 |
| 2,749,149 | A | | 6/1956 | Carpenter | |
| 3,551,006 | A | * | 12/1970 | Ulysses | 285/16 |
| 3,761,114 | A | * | 9/1973 | Blakeley | 285/111 |
| 3,895,833 | A | | 7/1975 | Thiessen | |
| 4,519,639 | A | * | 5/1985 | Florian | 285/415 |
| 5,314,215 | A | * | 5/1994 | Weinhold | 285/283 |
| 6,264,251 | B1 | * | 7/2001 | Kunsman et al. | 285/405 |
| 6,435,563 | B1 | * | 8/2002 | Phillips | 285/56 |

FOREIGN PATENT DOCUMENTS

| DE | 102 03 854 | 8/2003 |
|---|---|---|
| JP | 08135858 | 5/1996 |
| JP | 2000130662 | 5/2000 |
| JP | 2001003459 | 5/2001 |
| JP | 2001271978 | 10/2001 |

* cited by examiner

*Primary Examiner*—David Bochna
(74) *Attorney, Agent, or Firm*—Collard & Roe, P.C.

(57) ABSTRACT

A split flange is provided. The split flange may be capable of being fitted firmly around the pipe having a flexible pipe body and a flared portion formed at an end portion of the pipe body. The split flange is provided with two or more arcuate flange members and two connecting members located at both end portions of the flange members and projecting outward from outer circumferential faces thereof. The flange members may be connected to each other to form an annular structure. An operation for fitting the flange members firmly around the pipe body is carried out easily.

1 Claim, 5 Drawing Sheets

Fig. 2B
A-A sec

Fig. 2C
B-B sec

Fig. 6B
A-A sec

Fig. 6C
B-B sec

Fig. 8B
A-A sec

Fig. 8C
B-B sec

FLANGE

CROSS-REFERENCE TO RELATED APPLICATION

This application is based upon and claims the benefit of priority from the prior Japanese Patent Application No. 2003-314601 filed on Sep. 5, 2003, the entire contents of which are incorporated herein by reference.

FIELD OF THE INVENTION

This invention relates to a flange, and more particularly to a split flange being capable of being utilized with a flexible pipe joint.

RELATED ART

When a path of a feed water pipe laid in a building and various kinds of facilities is bent, and, in the portion of a pipe which is fixed to an installation, a flexible pipe joint having a comparatively small pipe length has heretofore been used. The flexible pipe joint is generally made of a flexible material, such as rubber so that an outer circumferential surface in axial section of a pipe body usually has a wavy or zigzag shape (e.g., bellows) for the purpose of increasing the flexibility thereof. When the pipe joint needs to have a pressure resistance, reinforcing materials such as tire cords of nylon and polyester or metal wires are installed in a pipe body thereof so as to prevent the pipe body from bursting. Furthermore, a reinforcing metal ring is installed in some cases in both end portions of the pipe body, which are connected to pipes.

The flexible pipe joint is generally connected to a pipe with respective flange portions. Therefore, the flexible pipe joint is provided with flanges or flange portions on both end portions thereof. The flanges are usually made integrally with the pipe body. However, in order to make the pipe body and flanges on both end portions integrally, a required metal die may have to have a complicated shape and it may be more likely to cause any defects during forming the flexible joint. Therefore, rather high skill in forming the object may be required such that the manufacturing cost increases.

Figure 9:
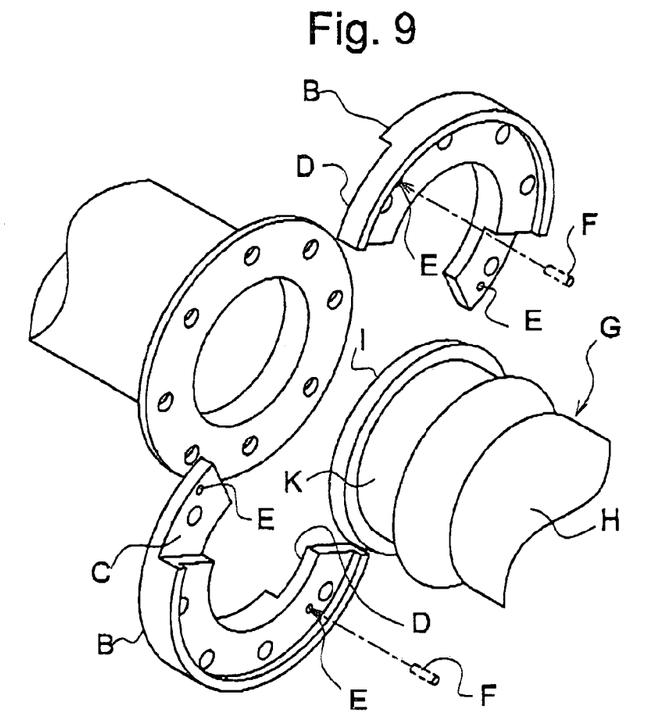
FIG. 9 is a perspective view of a flexible pipe joint.
Figure 10:
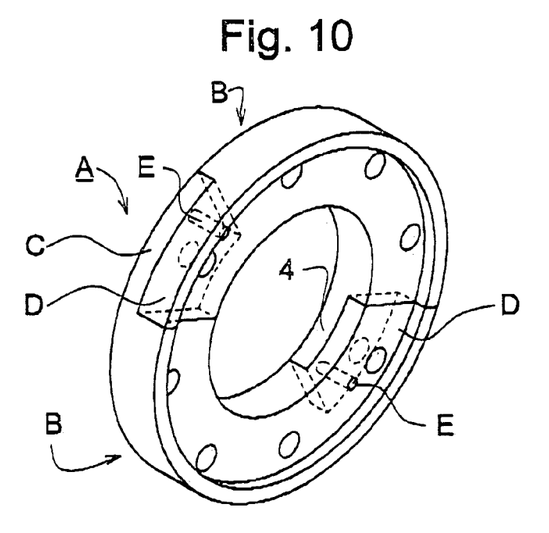
FIG. 10 is a perspective of a assembled complementary flange members.

Japanese unexamined patent application publication No. 2001-271978 (JP-A-2001-271978) discloses a flexible pipe joint with companion flange G comprising: a flexible pipe body H, flared portions I formed at an end portion of the pipe body H, a flange-fixing portion K provided on an axially inner side from the flared portion I, and a split type combined complementary flange A having dividing faces in an radial direction and capable of being fixed around the flange-fixing portion K as shown in FIGS. 9 and 10. The complementary flange A is provided with a pair of arcuate flange members B, each of which has thin or thin-walled portions C, D provided at both end portions of the each flange member B, and connecting members F for connecting the flange members B together. When the thin-walled portions C, D provided at both end portions of the flange members B are laminated on each other, the complementary flange A has a constant thickness in the circumferential direction. When the flange members B are connected together by the connecting members F, the complementary flange A can be annularly formed. Each of the connecting members F is composed of a pin, and the complementary flange A can be assembled by inserting the connecting members F into respective pin holes E provided in the thin-walled portions C, D. The flexible pipe joint G does may be formed without any complicated metal die for being manufactured.

However, in order to fix the flexible pipe joint G to a pipe, since the complementary flange A is divided into two flange members B, the flange members B are placed on the flange-fixing portion K of the pipe body H as the pipe body H and two flange members B are supported on a worker's hand and aligned with each other so that the pin holes E provided in the thin-walled portions C, D of the flange members B communicate with each other and the connecting members F (pins) are to be then fitted into the respective pin holes E. As described above, the operation is quite complicated and a very long work time may be required. Namely, it is not easy for one man to align the pin holes E with each other while the pipe body H and a plurality of flange members B are supported on his hand such that the connecting members (pins) F are fitted into the pin holes E. During this period the man has to maintain supporting the pipe body and flange members, which may not suitable for the one man. Thus, the operations may need to be carried out by two or more men in some cases. Since the connecting members (pins) F are parts separated from the flange members B and small such that it may be likely to lose the pins, the part should be carefully managed in storage. Moreover, when mating thin-walled portions C, D of neighboring respective flange members B are connected each other with one of the connecting members (pins) F fitted into the mating pin holes E, one of the neighboring flange members B cannot be turned around the connecting member (pin) F relative to the other flange member B. Namely, since the complimentary flange A cannot be opened by swiveling the flange members B relatively around the connecting member F, the complimentary flange A cannot be fixed around the flange-fixing portion K by firstly connecting mating thin-walled portions C, D of the flange members by the connecting member F and secondly placing the one-end connected flange members B around the flange-fixing portion K so as to complete the complimentary flange A by fitting the other connecting member F into the other mating pin holes E. Therefore, the flange A is fixed to the pipe body H with both flange members B held in the worker's hand at the same time so that the flange-fixing operation is not so easy.

SUMMARY OF THE INVENTION

In view of the above, the present invention provides a split flange formed by dividing of a flange provided at both or either end portion of a flexible pipe joint. The flange is divided into at least two flange members and is provided with one or more connecting portions, which connect the flange members. The one or more connecting portions project outward from an outer periphery of the flange such that the flange members may be joined each other at end portions thereof.

More concretely, the present invention provides the following split flanges.

(1) An annular split flange capable of being fitted around a pipe having a flexible pipe body and a flared portion formed at an end portion of the pipe body is provided. The split flange is provided with two or more arcuate flange members, and one or two connecting portions located at either or both end portions of each of the flange members. The connecting portions projects outward from an outer periphery. The neighboring flange members are connected together at mating connecting portions to form an annular structure.

In an aspect according to the present invention, the split flange includes at least two flange members, which may be connected together with connecting portions located at both end portions of each of the flange members and projecting outward from the outer circumferential faces or the outer periphery such that the assembled flange members form an annular shape. Thus, the split flange is fitted around a pipe body. Therefore, a complicated metal die for manufacturing a flexible pipe joint with a flange and a pipe body made integrally may not be needed. Since the connecting portions project outward from the outer periphery of the assembled flange members, half-assembled flange members, which are connected at mating end portions of the respective flange members such that one end portion of one of the flange members is overlapped or laminated with one end portion of the other of the flange members, the half-assembled flange members can be opened or closed without being obstructed so that the flange members are connected together and fitted firmly around a pipe body.

Since the connecting portions of the split flange are provided with connecting members for connecting the flange members together, the connecting members do not constitute separate parts from the flange members. Therefore, the number of parts can be reduced and the operations for fitting the split flange firmly around the pipe may be carried out in a labor-saved manner. Furthermore, it is less likely to lose the connecting members. The connecting portions may be formed, for example, by providing a male connecting portion and a female connecting portion such that the portions may mate each other. The male connecting portion is provided with a projection extending in a width direction (or a thrust direction when the split flange is fixed to a pipe). And the female connecting portion is provided with a connecting hole for fitting the projection therein such that the connected flange members may swivel around the projection in a vertical plane to the thrust direction.

These connecting portions are preferably formed to a pivotable structure so that, when one connecting portion of one flange member is connected to an opposed or mating connecting portion of the other, the split flange can be opened and closed around the projection as an axis of a pivotal or swivel movement thereof. When the split flange is fitted around the body of a pipe firmly, the split flange can be opened and closed owing to this structure even though the flange members are connected together at one end in advance so that the fitting of the split flange around the pipe body firmly can be done more easily. Namely, when the split flange is fitted around the pipe body firmly, the separately formed flange members, which are connected at one end of each flange member, can be handled in one piece so that the worker may not have to hold the flange members a worker's hand respectively. Therefore, the split flange fitting operation becomes easier. In this embodiment, the thickness of the connecting portions is set less than that of the flange members and a total thickness of the connecting portions in a laminated state could be equal to that of the flange members. It is preferable that the connecting portions be formed to a substantially arcuate shape in a plan view so that the connecting portions can be turned without being obstructed by other parts when the connecting portions are laminated on each other and connected together.

In order to join these connecting portions together pivotably or rotatably, for example, one of the two mating connecting portions is provided around a substantially central portion thereof with a projection extending toward the other connecting portion of the neighboring flange member, and the other connecting portion may be a connecting hole for fitting the projection therein. The projection of the first-mentioned connecting portion being fitted into the connecting hole in the second-mentioned connecting portion. In another example, the respective connecting portions are provided with connecting holes, and these connecting portions may be joined together with a fastening member so that they are fixed to each other tentatively by inserting the fastening member such as a bolt into the first- and second-mentioned connecting holes.

(2) A split flange according to (1) is characterized in that the features of the split flange reside in that one of the two connecting portions is provided with a projection and the other is provided with a connecting hole. The two connecting portions are laminated on each other and then connected together by fitting the projection into the connecting hole.

In another aspect according to the present invention, the flange members can be connected together by fitting the projection provided in s connecting portion into a connecting hole formed in the other connecting portion. Therefore, aligning the pin holes formed in the respective connecting portions and fitting s connecting member (pin), which is formed separately from the flange members, into the pin holes does not need to be carried out. Moreover, since a separately formed connecting member (pin) is not used, the number of parts is decreased. This enables the flange member connecting operation to be simplified. In addition, it is unlikely to lose the separately formed connecting members such as a pin.

This projection is provided around a substantially central portion of a connecting portion so that the projection extends in a thickness direction along a connecting hole formed in an opposed connecting portion of a mating flange member up to the other side of the connecting hole when the connection portions are laminated and joined. Although the shape of the projection is not limited to a columnar shape and a prismatic shape, it is preferably a circular cylinder or column (substantially circular shape in a plan view) standing along the direction of the thickness of the connecting portion, in such a manner that the flange members can be turned, for example, a columnar shape, and more preferably a frustum-conical shape in which the area of an upper face (face on the opposite side of the connecting portion) of the projection is set smaller than that of a lower face (face on the side of a connecting surface), e.g., a tapered column, so that the projection can be fitted easily into the connecting hole. On the other hand, the shape of the connecting hole is suitably determined in accordance with that of the projection, and may be a shape which permits the projection to be fitted in the connecting hole. This connecting hole may include a through hole and a semi-through hole. The axis of the projection and that of the connecting hole are set so that these axes are aligned with each other when the connecting portions are laminated on each other.

(3) A split flange according to (1) or (2) is characterized in that the thickness of the two connecting portions are set so that a total thickness of the two connecting portions in a laminated state becomes substantially equal to that of the flange members.

In yet another aspect according to the present invention, the thickness of the connecting portions in a laminated state of the flange members becomes substantially equal to that of the flange members so that the face of each flange member and that of the laminated connecting portions made even or flush with each other. Since the faces of the flange members and connecting portions are made even, the connecting portions of the split flange fitted firmly around a flexible pipe joint can be connected to the flange of a pipe on the flat face thereof.

(4) A split flange according to any one of (1) to (3) is characterized in that each flange member is provided at both end portions with thin-walled portions, which are laminated on and connected to each other to form a split flange having a constant thickness in the circumferential direction thereof.

In another aspect according to the present invention, each flange member may be thin at both end portions so that, when the end portions are laminated on those of the other flange member, a total thickness of each laminated end portion becomes equal to that of each flange member. And the flange members can be closed to form an annular shape with ease. When the flange members are laminated on each other at the respective end portions thereof, the end portions of the flange members may be pressed down so that the end portions of the flange members are fixed reliably. Furthermore, when bolt holes are formed in these end portions so that the split flange is connected to a pipe by inserting bolts through the bolt holes in the flange of the pipe and split flange of the flexible pipe joint and then tightened by nuts, the thin-walled portions laminated on each other at both end portions of the flange members are fastened to the flange of the pipe by the bolts. As a result, the end portions of the flange members are fixed more firmly. Since the thin-walled portions communicate with each other by bolts, the slippage of the connected end portions of the split flange can be suppressed when a deforming and vibratory force due to an earthquake is exerted thereon after the pipe and split flange connecting operation finishes. As a result, the air-tightness of the engaged surfaces of the pipe and flexible pipe joint come to be maintained.

(5) A split flange according to any one of (1) to (4) is characterized in that the flange members have recesses in inner circumferential side thereof.

In another aspect according to the present invention, flared portions provided at end portions of the pipe body are fitted in the recesses formed in the flange members when the split flange is fitted firmly around the pipe body, the aligning of the split flange can be done reliably. The slippage of the pipe body of the flexible pipe joint due to vibration occurring after the flexible pipe joint is connected to the pipe can also be prevented.

Each of the flange members may include a recess for fitting the flared portion of the flexible joint so that the recess is extending along the inner circumferential side of the split flange. It is therefore preferable to have even recesses when the split flange is assembled and fitted firmly to the pipe. The recess may be provided with a slant portion at the end portion of the flange member. The circumferential direction may be referred to as a longitudinal direction by developing the circumferential direction on a flat plane. The slant portion of the recess at the end portion may be formed with an inclined face extending upward to form a point portion at an end edge of the flange member in the circumferential (or semicircular) direction. Another slant portion may be provided in a similar way at another end edge of the flange member in the circumferential (or semicircular) direction so that the inclined face extends downward. When the flange members are connected together, joint portions of the recesses may be contact with the inclined faces thereof. Therefore, when the split flange is installed after the split flange is connected and fixed to the pipe, the joint portions of the recesses do not slip to be opened in a similar manner of a joined parts with a butt joint even though an inner pressure of the flexible pipe joint becomes high. Accordingly, it is unlikely to have leakage of an inner fluid from the joint portions.

The inner circumferential side referred to above of each flange member means the side of the surface of the flange member which contacts the pipe body when the split flange is fitted firmly around the pipe body, i.e. the side on which the inner circumferential surface of the annularly formed doughnut-shaped split flange is formed.

(6) A split flange according to any one of (1) to (5) is characterized that the plural flange members have the same shape.

In another aspect according to the present invention, the flange members may have the same shape so that the same metal die for manufacturing the flange members scan be utilized repeatedly. Therefore, the cost of the metal die may be lowered. When annular split flange comprising a plurality of flange members being connected together is formed, flange members of the same shape can be assembled to form the split flange. Therefore, manufacturing operation and costs may be simple and low.

(7) A split flange according to (6) is characterized in that the split flange is formed annularly by one set of flange members which includes two flange members.

In another aspect according to the present invention, the split flange may be composed of two flange members. Namely, the number of parts of the split flange fitted firmly around the pipe body is small and the flange member fitting operation can therefore be carried out in a labor-saved manner.

The split flange may not be manufactured integrally with a flexible pipe joint and a pipe body. But the split flange is prepared separately from a flexible pipe joint or a pipe body and is fitted to the flexible pipe joint on the spot. Therefore, a metal die for a complicated shape is not necessarily needed. This enables the flexible pipe joint to be provided at a low cost and in commercial quantity. Moreover, the pipe body and flange of this flexible pipe joint are formed separately. Therefore, a difference in diameter of the flange of a pipe can be dealt with by merely replacing the split flange with another with the same pipe body of the flexible pipe joint used. Since flexible pipe joints with which flanges of different diameters are made in one body may not be prepared, the cost of manufacturing the pipe joints can be reduced.

One of the two connecting portions of each flange member may be provided with a projection and the other connecting portion may be provided with a connecting hole. Therefore, by way of example, neighboring first and second flange members can be connected together by fitting a projection provided on a connecting portion of the first flange member into a connecting hole formed a connecting portion of the second flange member. The split flange may be formed such that a connecting member such as pin made separately from the connecting portion does not have to be fitted into the hole after the flange members are laminated on each other. Therefore, it is not necessary to additionally prepare a connecting member such as pin.

Moreover, the connecting portions for joining the flange members to each other are provided at both end portions of the flange members so that the connecting portions extend outward from the outer periphery of the split flange. Therefore, when one of the connecting portions of one flange member is connected to mating one of the connecting portions of the other flange member, the split flange can be turned around the combined connecting portions as an axis of pivotal or swivel movement. When the split flange-carrying flexible pipe joint is formed, the pipe joint can be fitted firmly around a pipe body by opening and closing the split flange. This causes the split flange fitting operation to be simplified, and the work efficiency to be improved. As a result, the manufacturing cost can be reduced.

DETAILED DESCRIPTION OF THE PREFERRED EMBODIMENT

The present invention will now be described more in detail with reference to the drawings.

Figure 1:
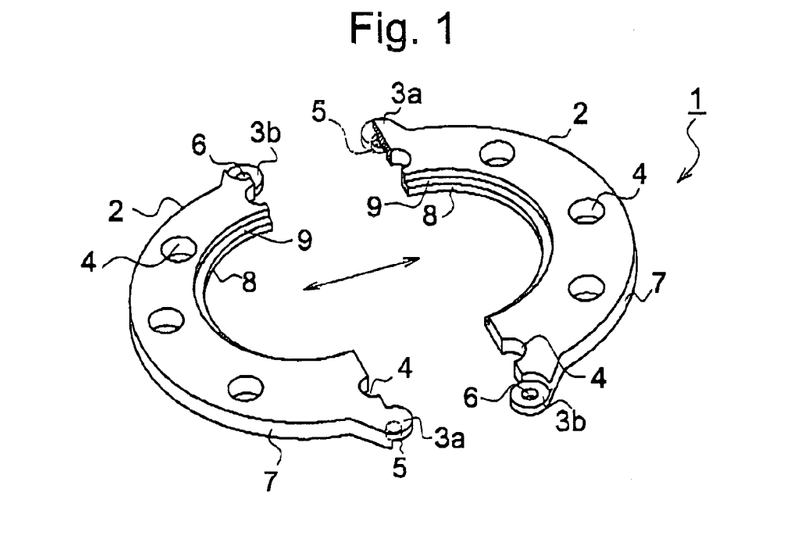
FIG. 1 is a perspective view of a split flange broken partially for a partial sectional view according to a first embodiment of the present invention.
Figure 2A:
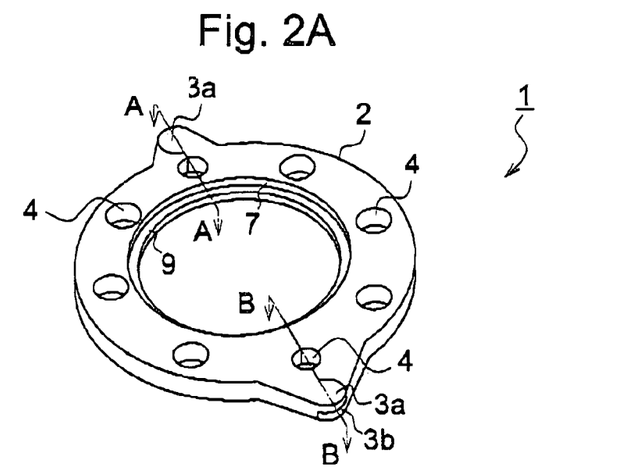
FIG. 2A is a perspective view of the assembled split flange shown in FIG. 1.
Figure 2B:
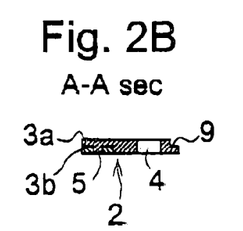
FIG. 2B is a sectional view taken along A—A line in FIG. 2A.
Figure 2C:
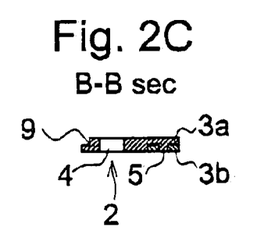
FIG. 2C is a sectional view taken along B—B line in FIG. 2A.
Figure 3:
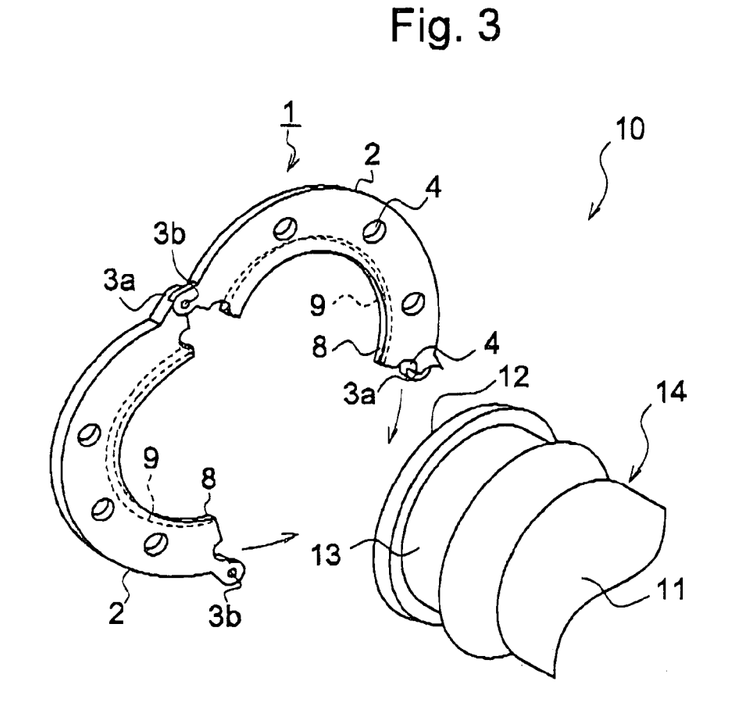
FIG. 3 illustrates a way of fitting the split flange in FIG. 1 according to the embodiment of the present invention.
Figure 4:
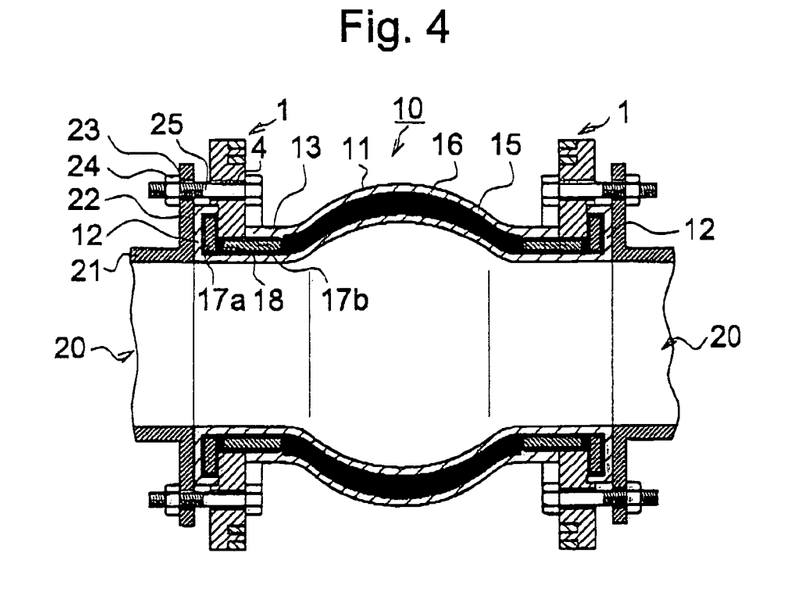
FIG. 4 is a sectional view of the flexible pipe joint connected to a pipe utilizing the split flange shown in FIG. 1.

FIG. 1 is a partially cutaway view in perspective showing a disassembled condition of the split flange according to a first embodiment of the present invention constituting a split flange-carrying flexible pipe joint. FIG. 2A is a drawing showing an assembled condition of the split flange according to a first embodiment. FIG. 2B is a sectional view taken along the line A—A in FIG. 2A. FIG. 2C is a sectional view taken along the line B—B in FIG. 2A. FIG. 3 is an explanatory drawing showing the procedure for firmly fitting the split flange according to the first embodiment of the present invention. FIG. 4 is an axial sectional view showing the condition of the flexible pipe joint connected to a pipe by using the split flange according to the first embodiment. In these drawings, the sizes of the parts are suitably modified so as to have the invention understood more easily.

As shown in FIG. 1, a split flange 1 is provided with a pair of arcuate flange members 2, and connecting portions 3a, 3b formed at both end portions of the flange members 2 and projecting from outer circumferential faces 7 of the flange members 2 in the outward direction. The connecting portions may be described that they extend outward from an outer periphery of a split flange assuming there are no connecting portions. Each flange member 2 has a semicircular arcuate length, and a plurality of regularly spaced bolt holes 4 (three holes and two semicircular holes in this embodiment). Each flange member 2 is provided in an inner circumferential face 8 thereof with a recess 9 extending along the inner circumferential face 8, hollowed out in the direction of the thickness of the flange member 2 to a depth smaller than the thickness of a flared portion 12 (FIG. 3) formed at both end portions of a pipe body 11, and adapted to hold the flared portion 12 therein. In order to reduce the weight and the cost of the material for the flange members 2, a plurality of recesses extending in the direction of the thickness thereof may be provided among the bolt holes 4, though the recesses are not shown.

The connecting portions 3a, 3b are formed to a thickness smaller than that of the flange members 2 so that, when the connecting portion 3a of one flange member 2 and the connecting portion 3b of the other flange member 2 are laminated on each other, a total thickness of the connected portions becomes equal to the thickness of a main portion of each flange member 2. The first-mentioned connecting portion 3a is provided around a substantially central portion thereof with a substantially columnar projection 5 extending in the thickness direction of the flange member 2 (from an upper side to a lower side of the drawing). The other connecting portion 3b is provided around a substantially central section thereof with a through connecting hole 6 for fitting the projection 5 thereinto. The connecting portions 3a and connecting portion 3b are formed so that, when the first-mentioned and second-mentioned connecting portions 3a, 3b are laminated on each other, the thrust axis of the projection 5 formed on the connecting portion 3a and that of the connecting hole 6 formed in the connecting portion 3b are aligned with each other. The connecting portions 3a, 3b of the two flared portions 2 are formed to a substantially arcuate shape in a plan view so that, when the connecting portion 3a of the first-mentioned flange member 2 and the connecting portion 3b of the second-mentioned flange member 2 are laminated on each other, the connecting portions 3a, 3b can be turned freely around the projection 5 of the connecting portion 3a as a pivotal axis. Although the connecting hole 6 is formed as a through hole, the type of the same hole 6 is determined suitably depending upon the shape of the projection 5. This hole 6 may be a through hole or a non-through hole as long as the hole has a shape permitting the projection 5 to be fitted thereinto. When the projection 5 is frusto-conical, in which the area of the upper surface thereof is set smaller than that of the lower surface thereof, the projection can be fitted easily into the hole 6, so that such a projection is preferable. The shapes of these parts are not limited to the above-mentioned shapes.

When the projection 5 of the connecting portion 3a of the first-mentioned flange member 2 is fitted into the connecting hole 6 of the connecting portion 3b of the second-mentioned flange member 2 with the connecting portions 3a, 3b laminated on each other in an aligned state, a split flange 1 shown in FIG. 2A is formed. The cross sections of the laminated portions at which the connecting portions 3a, 3b are laminated on each other areas shown in FIG. 2B and FIG. 2C. Namely, the projections 5 provided on the connecting portions 3a are fitted into the connecting holes 6 formed in the connecting portions 3b, and the two flange members 2 are thereby connected and fixed to each other. The flange member-connected split flange 1 can be opened and closed (refer to FIG. 3) in the direction as indicated by arrows around the projection 5 provided on the connecting portion 3a.

The split flange 1 shown in FIG. 1 and FIG. 2 is fitted around the pipe body 11 of the pipe 14 in the following manner to form the split flange-carrying flexible joint 10 (FIG. 4). As shown in FIG. 1, two flange members 2 are placed so that the inner circumferential faces 8 thereof are opposed to each other, and the connecting portion 3a of one flange member 2 and a connecting portion 3b of the other flange member 2 are laminated on each other. As shown in FIG. 2B, the projections formed on the connecting portions 3a are fitted into the connecting holes 6 formed in the connecting portions 3b to join the flange members 2 together. The split flange 1 in which the connecting portions 3a, 3b are joined to each other is then held with the non-connected side outstretched as shown in FIG. 3, and fitted firmly around the pipe body 11 by bringing the inner circumferential faces 8 of the flange members 2 into contact with the flange fitting portion 13 provided in the pipe body 11. During this time, the split flange is fitted firmly around the flange fitting portion 13 so that the recesses 9 are opposed to the flared portion 12 formed on the pipe body 11. The projection 5 of the second-mentioned connecting portion 3a of each flange member 2 is fitted into the connecting hole 6 of the connecting portion 3b to join and fix the flange members 2 to each other (refer to FIG. 2C).

Since the flange members 2 are connected to each other by fitting the projections 5 provided on the connecting portions 3a into the connecting holes formed in the connecting portions 3b as described above, separately formed connecting members are not needed so that the number of parts can be reduced. Moreover, the connecting portions 3a, 3b are provided on the outer sides of the outer circumferential faces 7 of the flange members 2. Therefore, when the two flange members 2 are connected together in advance with the connecting portions 3a of one flange member 2 and connecting portions 3b of the other flange member 2 laminated on each other, the split flange can be opened and closed around these connected portions as a pivotal axis so that the split flange fitting operation can be carried out easily.

In this embodiment, providing the first-mentioned connecting portions 3a with the projections 5, and the second-mentioned connecting portions 3b with the connecting holes 6, fitting the projections 3b into the holes 6, and thereby connecting and fixing the flange members 2 to each other are employed as flange member connecting means but such means are not limited to the above-described means. For example, through holes 6, which are not illustrated, are formed in the connecting portions 3a, 3b, which may then be connected and fixed to each other by fastening members such as bolt. One of the connecting portions 3a, 3b is provided with through connecting holes 6 with the other provided with threaded holes 6, and the connecting portions 3a, 3b may be connected and fixed to each other by fastening members such as butterfly bolt.

The condition of the flexible pipe joint 10 connected to a pipe 20 by using the split flange 1 in the above-described first embodiment will be described with reference to FIG. 4.

The outer circumference of the pipe body 11 of the flexible pipe joint 10 has a bulge shape in axial sectional view, and the pipe body 11 is formed integrally in the condition in which the reinforcing fibers 16 such as tire cords are installed in the elastic layer 15 such as a rubber layer. On the inner sides of the flared portions 12 and flange fitting portions 13 formed at both end portions of the pipe body 11, metal rings 17a, 17b connected integrally at a welding portion 18 are installed. On the other hand, the pipe 20 has flanges 22 at the end portion of the pipe body 21 and a plurality of bolt holes 23 are provided in the flange 22 with predetermined intervals.

A method of connecting the flexible pipe joint 10 to the pipe 20 will now be described with reference to FIG. 1 to FIG. 4.

First, a pair of flange members 2 the sizes of which correspond to sizes of the flange 22 of the pipe 20 are fitted firmly around the flange fitting portion 13 of the flexible pipe joint 10. Namely, as shown in FIG. 1 described above, the two flange members 2 are placed so that the inner circumferential faces 8 thereof are opposed to each other, and the connecting portion 3a of one flange member 2 and that 3b of the other flange member 2 are laminated on each other, the projection 5 provided on the connecting portion 3a being fitted into the connecting hole 6 formed in the connecting portion 3b to connect the flange members 2 together as shown in FIG. 2B. The split flange 1 in which the connecting portions 3a, 3b are connected together is then held in an outstretched state at the non-connected side as shown in FIG. 3 and fitted firmly around the flange fitting portion 13 formed in the pipe body 11 with the inner circumferential faces 8 of the flange members 2 engaged with the flange fitting portion 13. During this time, the split flange 1 is fitted around the flared portion 12 formed in the pipe body 11 so that the recesses 9 formed in the flange members 2 are opposed to the flared portion 12 formed in the pipe body 11. The projection 5 of the second-mentioned connecting portion 3a of each flange member 2 is then fitted in the connecting hole 6 of the connecting portion 3b to connect and fix the flange members 2 to each other (refer to FIG. 2C).

The face of the flared portion 12 of the flexible pipe joint 10 around which the split flange 1 is fitted firmly in this manner is engaged with a face of the flange 22 of the pipe 20, and the bolt holes provided in the split flange 1 on the flexible joint 10 and the bolt holes 23 provided in the flange 22 of the pipe 20 are aligned with each other. The bolts 25 are then inserted into the bolt holes 23, and fastened by nuts 24. Owing to this bolt fastening operation, the flexible pipe joint 10 is flange-connected to the pipe 20 as shown in FIG. 4.

The split flange according to a second embodiment of the present invention constituting a split flange-carrying flexible pipe joint will now be described.

Figure 5:
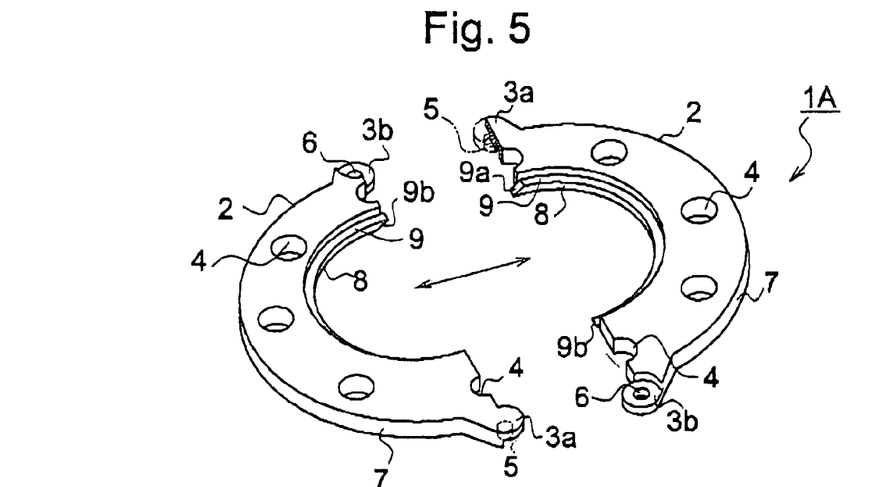
FIG. 5 is a perspective view of a split flange broken partially for a partial sectional view according to a second embodiment of the present invention.
Figure 6A:
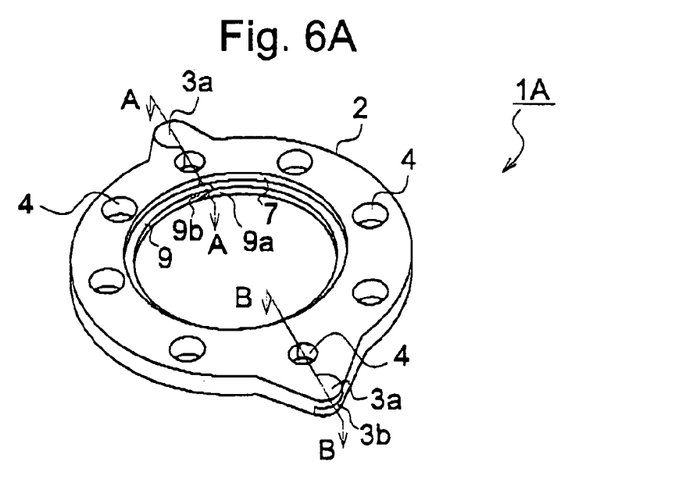
FIG. 6A is a perspective view of the assembled split flange shown in FIG. 5.
Figure 6B:
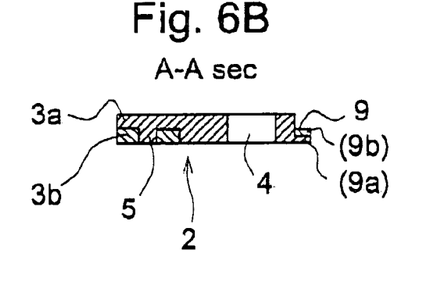
FIG. 6B is a sectional view taken along A—A line in FIG. 6A.
Figure 6C:
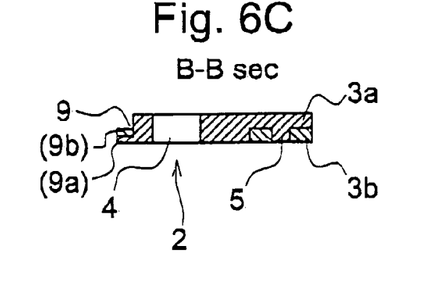
FIG. 6C is a sectional view taken along B—B line in FIG. 6A.

FIG. 5 is a perspective view showing a disassembled condition of the split flange according to the second embodiment of the present invention constituting a split flange-carrying flexible pipe joint, and FIG. 6 a drawing showing an assembled condition of the split flange in the second embodiment, wherein FIG. 6A is a perspective view, FIG. 6B a sectional view taken along the line A—A in FIG. 6A, and FIG. 6C a sectional view taken along the line B—B in FIG. 6A. In this embodiment, the constituent elements identical with those of the split flange in the first embodiment are designated by the same reference numerals, and a duplicated description thereof will be omitted. In these drawings, the sizes of the parts are modified suitably so as to have the embodiment understood with ease.

As shown in FIGS. 5 and 6, the split flange 1A in the second embodiment is formed by inclining an end portion in the semicircular direction (longitudinal direction) of such a recess 9 that is formed along an inner face 8 of each flange member 2 of the above-described first embodiment. Namely, as in the first embodiment, the split flange 1A is provided with a pair of arcuate flange members 2, and connecting portions 3a, 3b formed at both end portions of these flange members 2 so as to project outward from outer circumferential faces 7 thereof. One of the end portions in the semicircular direction (longitudinal direction) of the recess 9 formed along the inner circumferential face 8 of each flange member 2 has an inclined portion 9a inclining and extending from a position on the inner side of an edge in the semicircular direction (longitudinal direction) of the flange member 2 in the forward and downward direction at an angle of substantially 45°. The other of the end portions has an inclined portion 9b inclining and extending from a position outwardly away from the edge in the semicircular direction (longitudinal direction) of the flange member 2 in the rearward and downward direction at an angle of substantially 45°. The connecting portions 3a, 3b and other constituent elements and the shapes thereof are identical with those of the first embodiment, and a description thereof will therefore be omitted.

When the flange members 2 are thus connected together by inclining the end portions in the semicircular direction (longitudinal direction) of the recesses 9, joint portions of the recesses 9 are put in the condition (referring to FIG. 6) in which the first inclined portion 9a and second inclined portion 9b are laminated on each other. Therefore, even when an inner pressure of the flexible joint 10 (referring to FIG. 4) becomes high during the use of the split flange 1 after the flange members 2 are fitted firmly around the flexible joint 10, the joint portions of the recesses 9 do not slip and cause the flange members 2 to be opened unlike joint portions of the recesses of a butt joint. As a result, it is unlikely to cause fluid leaks from the interior of the joint portions to the outside.

A method of connecting the flexible pipe joint using the split flange 1A in the second embodiment to the pipe 20 is also carried out in the same manner as in the above-described first embodiment, so that a description thereof will be omitted.

According to a third embodiment of the present invention, a split flange constituting a split flange-carrying flexible pipe joint will now be described.

Figure 7:
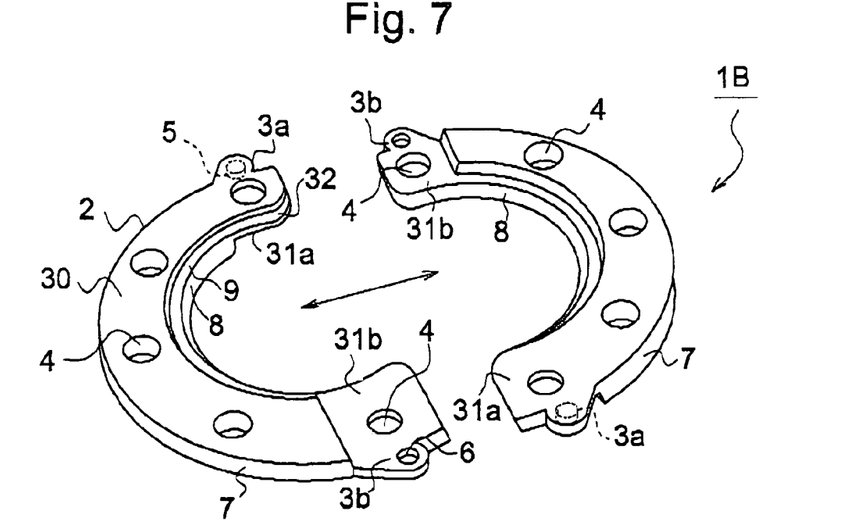
FIG. 7 is a perspective view of a split flange according to a third embodiment of the present invention.
Figure 8A:
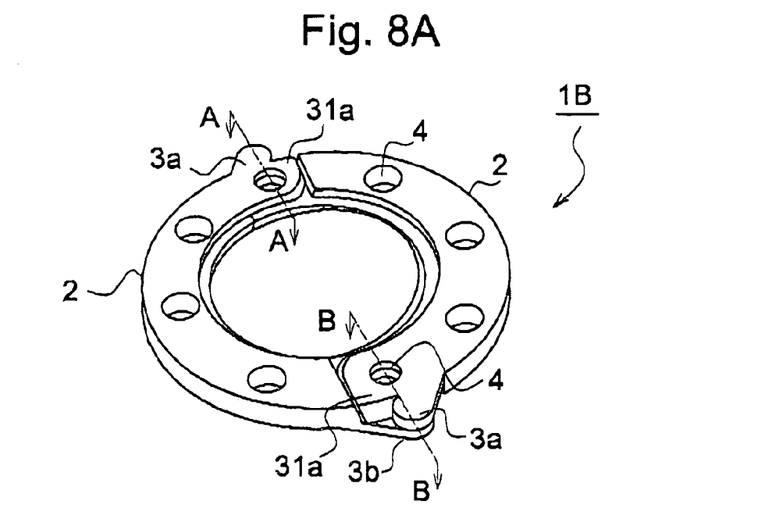
FIG. 8A is a perspective view of the assembled split flange shown in FIG. 7.
Figure 8B:
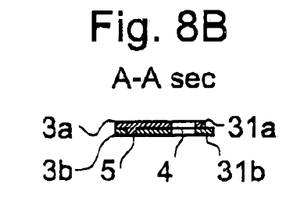
FIG. 8B is a sectional view taken along A—A line in FIG. 8A.
Figure 8C:
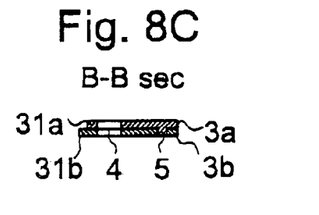
FIG. 8C is a sectional view taken along B—B line in FIG. 8A.

FIG. 7 is a perspective view showing a disassembled condition of the split flange in the third embodiment which constitutes a flexible pipe joint around which the split flange is firmly fitted, and FIG. 8 a drawing showing an assembled condition of the split flange in the third embodiment, in which FIG. 8A is a perspective view, FIG. 8B a sectional view taken along the line A—A in FIG. 8A, and FIG. 8C a sectional view taken along the line B—B in FIG. 8A. In the embodiment which will be described below, the constituent elements identical with constituent elements of the split flange in the first embodiment will be designated by the same reference numerals, and a duplicated description thereof will be omitted. In these drawings, the sizes of the parts are suitably regulated for having the embodiment understood easily.

As shown in FIGS. 7 and 8, the split flange 1B according to the third embodiment is provided at both end portions of such flange members 2 as are in the split flange according to the first embodiment with thin-walled portions 31a, 31b. The split flange 1B is provided with a pair of arcuate flange members 2, and connecting portions 3a, 3b for connecting these flange members 2 together. Each flange member 2 has an arcuate length slightly larger than a semicircular length of the same radius, and a thick-walled portion 30 at an intermediate section thereof and thin-walled portions 31a, 31b at both end portions thereof. The thin-walled portions 31a, 31b are formed in a stepped state on the opposite sides with respect to the direction of the thickness of the flange members 2. When the flange members 2 are laminated on each other so that the thin-walled portions 31a, 31b of one flange member 2 are aligned with those 31a, 31b of the other, such a split flange 1B of a predetermined thickness in the circumferential direction thereof as shown in FIG. 8 is formed. The thick-walled portions 30 and thin-walled portions 31a, 31b are provided respectively with a plurality of bolt holes 4 (in this embodiment, three in the thick-walled portions 30, and one in each of the thin-walled portions 31a, 31b). The bolt holes 4 of the thin-walled portions 31a, 31b are formed so that, when the thin-walled portions 31a, 31b are laminated on each other, the axes of the bolt holes 4 are aligned with each other. One of inner circumferential side corner sections 32 of the thin-walled portion 31a of each flange member 2 is formed arcuately. Forming this inner circumferential side corner section 32 arcuately is preferable because the corner section 32 can be prevented from impinging upon an outer circumferential surface of a flange fitting portion 13 (referring to FIG. 3) when the split flange 1B is put on the outer circumference of the same flange fitting portion 13 of a pipe body 11 (referring to FIG. 3) but this inner circumferential side corner portion 32 may not be formed arcuately in particular.

The split flange 1B in the third embodiment shown in FIGS. 7 and 8 is firmly fitted around the pipe body in the same procedure as the split flange in the first embodiment described above, to form a split flange-carrying flexible pipe joint. First, as shown in FIG. 7, the connecting portion 3a of one flange member 2 and the connecting portion 3b of the other flange member 2 are laminated on each other so that the inner circumferential faces 8 of the two flange members 2 are opposed to each other, and a projection 5 provided on the connecting portion 3a is fitted in the connecting hole 6 formed in the connecting portion 3b as shown in FIG. 8B, to connect the flange members 2 together. The split flange 1B in which the connecting portions 3a, 3b are connected together is then held with a non-connected side thereof outstretched as shown in FIG. 3, and the split flange is fitted firmly around the flange fitting portion 13 provided in the pipe body 11 with the inner circumferential faces 8 of the flange members 2 engaged with the flange fitting portion 13. During this time, the flange members 2 are fitted firmly around the pipe body 11 so that recesses 9 formed in the flange members 2 are opposed to the flared portion 12 formed in the pipe body 11. The projections 5 provided on the second-mentioned connecting portions 3a of the flange members 2 are then fitted in the connecting holes 6 formed in the connecting portions 3b to join and fix the flange members 2 to each other (refer to FIG. 8C).

In this embodiment, the flange members are connected together by fitting the projection 5 provided on the connecting portion 3a into the connecting hole 6 of the connecting portion 3b in the same manner as in the first embodiment. Therefore, separately formed connecting members are not needed, and the number of parts can be reduced. Moreover, the connecting portions 3a, 3b are provided on the outer sides of the outer circumferential faces 7 of the flange members 2. Therefore, even when the two flange members 2 are connected together in advance by laminating the connecting portion 3a of the first-mentioned flange member 2 and the connection portion 3b of the second-mentioned flange member 2, the flange members can be opened and closed around the connected portion as a pivotal axis. This enables an operation for fitting the split flange around the pipe to be carried out easily.

As a means for connecting the two flange members 2 together, through holes 6 are formed in, for example, the connecting portions 3a, 3b as described in the statement of the first embodiment, and the connecting portions 3a, 3b may then be connected and fixed to each other by fastening members such as bolt. Also, through holes 6 are formed in one of the connecting portions 3a, 3b and threaded holes are formed in the other. The connecting portions may be connected and fixed to each other by fastening members such as butterfly bolt.

The method of connecting the flexible pipe joint to the pipe 20 using such split flange 1B used in the third embodiment is also carried out in the same manner as in the first embodiment so that a description of the method will be omitted. The outer face of the flared portion 12 of the flexible pipe joint around which the split flange 1B is fitted firmly is brought into contact with the outer face of the flange 22 of the pipe 20. The bolt holes 4 provided in the split flange 1B on the flexible pipe joint and bolt holes 23 provided in the flange 22 of the pipe 20 are aligned with each other. The bolts 25 are then inserted into the respective bolt holes and fastened (refer to FIG. 4) by nuts 24. Since bolt holes 4 are also provided in the thin-walled portions 31a, 31b of the flange members 2, the fixing of the joint portions of the flange members 2 is done more reliably. Even when the flange members receive deforming and vibratory force based on an external force due to an earthquake or the like after the flange members are connected to the pipe 20, it is unlikely that the end portions of the flange members 2 are opened to cause a clearance to occur.

Regarding the split flange according to the present invention, a concrete description was given as above with reference to the drawings showing the examples thereof but the present invention is not originally limited to the illustrated examples. It is possible that the present invention be practiced by suitably adding alterations within the scope adaptable to the above-mentioned gist thereof, which alterations are all included in the technical scope of the invention.

What is claimed is:

1. A split flange capable of being fitted around a pipe having a flexible pipe body and a flared portion formed at an end of the pipe, the flared portion being capable of engaging with the split flange, the split flange comprising:

a plurality of arcuate flange members, which form a flange shape being defined by a circular outer periphery upon assembling;

two connecting portions provided at two end portions and formed integral with each of said plurality of arcuate flange members, the two connecting portions projecting radially out from the outer periphery, wherein neighboring flange members among said plurality of arcuate flange members are capable of being rotatably connected to each other at said connecting portions forming respective mating connecting portions;

wherein one of said respective mating connecting portions has a projection; and wherein the other connecting portion of said respective mating connecting portions has a connecting hole, said projection being fitted into said connecting hole, whereby said respective mating connecting portions are rotatably joined together;

wherein each end portion of each flange member is formed as a thinner portion than a neighboring body portion of said flange member such that these end portions can be connected to each other in a laminated manner wherein a thickness of the split flange is constant over a circumferential direction upon assembling;

wherein each of said plurality of flange members have at least one recess for holding a flared portion of a pipe therein, such that said at least one recess forms a circumferential recess at an inner circumferential side face of said plurality of flange members upon assembling and wherein each flange member further comprises slant portions disposed at end portions of the plurality of flange members.

* * * * *